United States Patent [19]

Smith et al.

[11] Patent Number: 4,659,871
[45] Date of Patent: Apr. 21, 1987

[54] CABLE WITH FLAME RETARDED CLADDING

[75] Inventors: Timothy S. Smith, Trowbridge; Richard J. Murphy, Chippenham, both of England

[73] Assignee: Raychem Limited, London, England

[21] Appl. No.: 879,550

[22] Filed: Jun. 24, 1986

Related U.S. Application Data

[63] Continuation of Ser. No. 537,315, Sep. 28, 1983.

[30] Foreign Application Priority Data

Oct. 1, 1982 [GB] United Kingdom ................. 8228092
Feb. 17, 1983 [GB] United Kingdom ................. 8304415

[51] Int. Cl.$^4$ .............................................. H01B 7/02
[52] U.S. Cl. ............................ 174/113 R; 174/121 A; 428/389
[58] Field of Search ....................... 174/113 R, 121 A; 428/372, 377, 383, 384, 389, 379, 921

[56] References Cited

U.S. PATENT DOCUMENTS

| Re. 28,688 | 1/1976 | Cook | 260/4 |
|---|---|---|---|
| 2,027,962 | 1/1936 | Currie | 264/230 |
| 3,086,242 | 4/1963 | Cook | 264/566 |
| 3,571,490 | 3/1971 | Bunish | 174/113 R |
| 3,602,636 | 8/1971 | Evans | 174/115 |
| 4,001,128 | 1/1977 | Penneck | 174/137 B X |
| 4,034,153 | 7/1977 | Andres et al. | 174/120 SR |
| 4,145,475 | 3/1979 | Vostovich | 428/389 |
| 4,280,225 | 7/1981 | Willis | 174/121 A |
| 4,322,575 | 3/1982 | Skipper | 174/120 SR |
| 4,370,076 | 1/1983 | Sullivan et al. | 174/110 PM X |
| 4,419,475 | 12/1983 | Vostovich | 428/389 |
| 4,430,470 | 2/1984 | Taniguchi et al. | 174/110 A X |
| 4,456,654 | 6/1984 | Kotian | 428/391 X |

FOREIGN PATENT DOCUMENTS

| 873828 | 6/1971 | Canada . | |
|---|---|---|---|
| 1029452 | 12/1975 | Canada . | |
| 10586 | 5/1980 | European Pat. Off. . | |
| 17579 | 10/1980 | European Pat. Off. . | |
| 17609 | 10/1980 | European Pat. Off. . | |
| 1480090 | 7/1971 | United Kingdom . | |
| 1440524 | 6/1976 | United Kingdom . | |
| 1448819 | 9/1976 | United Kingdom . | |
| 1448820 | 9/1976 | United Kingdom . | |
| 1473972 | 5/1977 | United Kingdom . | |
| 1529042 | 10/1978 | United Kingdom . | |
| 1532930 | 11/1978 | United Kingdom . | |
| 2005283 | 4/1979 | United Kingdom . | |
| 2009488 | 6/1979 | United Kingdom . | |
| 1548232 | 7/1979 | United Kingdom . | |
| 2011450 | 7/1979 | United Kingdom . | |
| 2019412 | 10/1979 | United Kingdom . | |
| 1555644 | 11/1979 | United Kingdom . | |
| 2050041 | 12/1980 | United Kingdom . | |
| 1533956 | 2/1981 | United Kingdom | 174/121 A |
| 2059140 | 4/1981 | United Kingdom | 174/121 A |
| 2068347 | 8/1981 | United Kingdom . | |
| 1603205 | 11/1981 | United Kingdom . | |
| 2074898 | 11/1981 | United Kingdom . | |
| 2128394 | 4/1984 | United Kingdom | 174/121 A |

OTHER PUBLICATIONS

Mayer, H. A. et al; New Generation of Non-halogenated, Flame Retardant Compounds and Cables, Conference: Cherry Hill, N.J., Proceedings of the 29th International Wire and Cable Symposium; Nov. 18-20, 1980. , LaGase, F. E. et al.; Material and Cable Design for Nuclear Power Generating Station Installations; Rome Cable Division, Cyprus Mines Corporation; Sep. 1975.

Primary Examiner—Morris H. Nimmo
Attorney, Agent, or Firm—Edith A. Rice; Herbert G. Burkard

[57] ABSTRACT

Polymeric cladding for elongate substrates, preferably electrical conductors, comprises an inner layer and an outer layer, the outer layer being a cross-linked polymer composition filled with halogen-free particulate inorganic flame-retardant filler which has been treated with material which increases the elongation to break of the composition at 200° C. to at least 50%. The enhanced elongation enables the cladding better to resist burning, possibly by reducing the tendency for the outer layer to split when exposed to fire. Bundles of insulated electrical wires may be wrapped in mineral tape, preferably mica tape, to provide circuit integrity cables which are significantly smaller and/or lighter than previously known.

10 Claims, 1 Drawing Figure

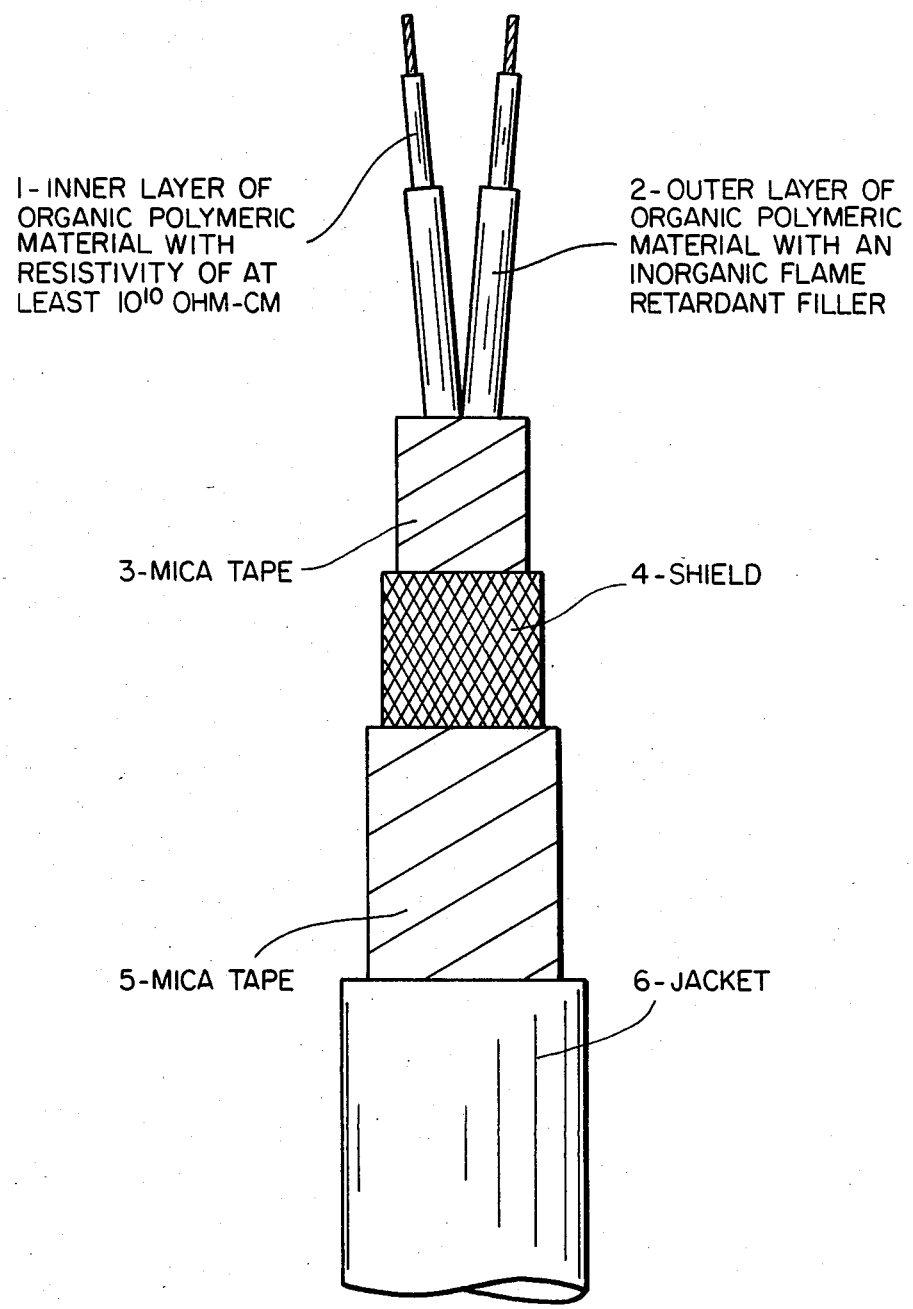
FIG_1

CABLE WITH FLAME RETARDED CLADDING

This is a continuation of application Ser. No. 537,315, filed 9/28/83, now abandoned.

This invention relates to flame retarded claddings for elongate substrates, especially electrical wires, and to electrical cables.

In many fields of application of electrical wires and other cladded substrates it is necessary that the cladding exhibits not only the required physical properties, for example electrical resistance in the case of an electrical wire, but also that it is effectively flame retarded. Known flame retardant systems based on highly halogenated organic compounds suffer from the disadvantage that when they are heated to a high temperature for example during a fire, they liberate undesirable gases such as hydrogen halides. Accordingly, it is preferred to use claddings which incorporate halogen-free flame retardants such as particulate inorganic flame retardant fillers.

According to one aspect, the present invention provides a flame retarded composite cladding for an elongate substrate which comprises a tubular inner layer formed from a polymeric material and an outer layer surrounding the inner layer and in contact therewith over substantially the entire circumference of the inner layer, the outer layer being formed from a polymeric composition comprising a crosslinked polymer and an effective amount of a particulate inorganic halogen-free flame retardant that has been treated with a treatment material that will increase the elongation to break of the resulting polymeric composition at 200° C. to a value of at least 50%, preferably at least 60% and especially at least 70%.

The preferred inorganic retardants are those that release water on heating, particularly hydrated aluminium oxides of the formula $Al_2O_3xH_2O$, wherein in x lies in the range 0.5 to 3 especially $Al_2O_3.3H_2O$, ammonium or sodium dawsonite, hydrated magnesia and hydrated calcium silicate, especially alpha-alumina trihydrate preferably having a specific surface area of at least O.1 $m^2/g$, more preferably at least 1 $m^2/g$, especially at least 4 $m^2/g$. The flame retardants ususally have a specific surface area of not more than 300 $m^2/g$, for example not more than 100 $m^2/g$, more ususally not more than 40 $m^2/g$ for example not more than 16 $m^2/g$, as measured by the Brunauer, Emmett and Teller (BET) nitrogen absorption method.

The particle size of the flame retardant is preferably less than 5 microns, and most preferably less than 2 microns. Alternatively or additionally, it may be advantageous to employ a flame retardant comprising a blend of different particle sizes, for example to reduce the melt viscosity of the composition.

The quantity of flame retardant filler used will depend at least partly on the flammability of the polymers used in the outer layer and is usually at least 50% and preferably at least 60% by weight based on the total weight of the polymeric composition. If the flame retardant filler is employed in lower amounts it may not protect the outer layer from burning. Preferably the treated flame retardant is present in an amount of at least 65% and especially at least 70% by weight, based on the total weight of the composition. The flame retardant composition is usually employed in amounts of not more than 85% and preferably not more than 80% by weight based on the total weight of the polymeric composition since higher levels may lead to unacceptable deterioration of the mechanical properties of the outer layer.

Since it is not possible for a single material or composition both to satisfy the operational requirements of the cladding, for example the required electrical properties in the case of an electrical wire and to be highly flame retarded without using highly halogenated systems, a dual wall cladding is provided having an inner layer chosen to exhibit the required operational properties for the intended use, at the expense of its flame retardancy, and the outer layer is provided as a highly flame retarded jacket with less attention to the operational properties.

We have observed that when the inorganic flame retardant is untreated or is treated with surface treatment materials not according to the invention and the cladded substrate is subjected to stringent flammability tests such as the verticial flammability test U.L. (Underwriters' Laboratories) 758 VW-1, the flame propagates along the cladding to cause failure of the sample even though the outer layer does not itself burn. In contrast, when the flame retardant has been surface treated according to this invention with a material that increases the elongation to break of the resulting polymeric composition at 200° to at least 50%, the propagation of the flame along the cladding is significantly reduced.

It appears that flame propagation along cladding that employs flame retardants that are not treated according to the invention may be caused or assisted by splitting of the outer layer in areas adjacent to the flame, which splitting exposes the underlying, relatively combustible, inner layer to ambient oxygen. Without being bound by any particular theory as to the flame propagation, it is conjectured that when the cladding contains water-releasing flame-retardant materials or other materials that release vapour or gases on heating, release of water vapour or other gases on heating causes the inner and/or outer layer to expand. However, because the polymeric composition forming the outer layer is highly filled with the inorganic flame retardant, and thus has a relatively low elongation to break, it is not capable of stretching sufficiently to accommodate the expansion without splitting, whereas, in the cladding according to the invention the outer layer is able to accommodate the expansion without significant splitting and so prevents exposure of the inner layer to air.

Thus, according to another aspect, the invention provides a flame retarded composite cladding for an elongate substrate, which comprises a tubular inner layer formed from a polymeric material and an outer layer surrounding the inner layer and in contact therewith over substantially the entire circumference of the inner layer, the outer layer being formed from a polymeric composition comprising a crosslinked polymer and an effective amount of a particulate inorganic halogen-free flame retardant, the inner and/or outer layer containing a material that releases gas on heating (e.g. a flame retardant that releases water on heating), and the flame retardant of the outer layer having been treated with a material that will increase the elongation to break of the resulting polymeric composition to a value that enables the outer layer to accommodate release of gas from the inner and/or outer layer or swelling caused thereby without splitting at the temperature at which the swelling or gas release occurs, e.g. about 250° C. for alumina trihydrate or 380° C. for $Mg(OH)_2$ although this may occur at lower temperatures depending for example on the acidic nature of the polymer.

The preferred surface treatment material for the inorganic flame retardant is lactic acid and is preferably present in an amount in the range of from 0.1 to 15% by weight, especially from 1 to 10% by weight based on weight of the untreated flame retardant.

The flame retardants mentioned above may be employed as the sole flame retardant or may be employed in combination with each other or with other flame retardants or fillers, in which case any one or more of the flame retardants may be surface treated with the surface treatment material. One particularly useful group of additional components, especially when the flame retardant composition comprises hydrated alumina, are antimony (V) compounds, preferably antimony pentoxide e.g. antimony pentoxide monohdrate, or antimony pentoxide precursors. These compounds reduce the tendency of the hyrated alumina to absorb water and therefore improve the electrical properties of the flame retarded compositions in wet environments as described in U.K. patent application No. 2,068,347A, the disclosure of which is incorporated herein by reference.

The polymeric composition forming the outer layer preferably includes an elastomer or thermoplastic elastomer such as those described in the UK patent application No. 2,068,347A above, as the sole polymeric component or as one component (preferably the major component) of a polymer blend. Preferred elastomers include alkene homo- or copolymer elastomers, especially ethylene copolymer elastomers, the term "copolymer" as used herein including terpolymers and polymers based on four or more comonomers. Whilst it is possible to use elastomers based on solely on hydrocarbon monomers e.g. ethylene/propylene/rubber, styrene/butadiene rubber or EPDM (ethylene/propylene/diene monomer), it is preferred, in order to reduce smoke generation to use homo- or copolymers that include oxygen containing monomers e.g. vinyl ester or acrylic monomers. Examples of such copolymers include alkene/vinyl ester copolymers formed from vinyl esters of $C_1$ to $C_{20}$ alkanols especially vinyl acetate and from $C_2$ to $C_6$ alkene, preferably -unsaturated alkenes such as ethylene, 1-propylene and 1-butene, and especially ethylene. Preferably the vinyl ester monomer is present in an amount of at least 5 mole percent, more preferably at least 10 mole percent, e.g. from 20 to 95 mole percent, and especially at least 30 mole percent e.g. from 40 to 90 mole percent. The acrylic homo- or copolymers of interest are acrylic or meth-acrylic acid esters or alcohols having a substituted or unsubstituted hydrocarbon group having up to 20 carbon atoms, which may optionally include one or more hetero atoms, preferably an alkyl, alkenyl, alkoxyalkyl or alkoxyalkenyl aryl or aralkyl group having up to 20 carbon atoms, e.g. phenyl, naphthyl or benzyl, and particularly $C_1$-$C_{15}$ alkyl, phenyl or benzyl.

Preferred homo polymers include polyethyl acrylate, polybutyl acrylate. Particularly preferred (meth)acrylate copolymers are ethylene/ethyl acrylate (18 weight percent), ethylene/ethyl methacrylate (20 weight percent) and terpolymers of ethylene, methyl acrylate and a cure-site carboxyl-containing monomer such as the terpolymer commercially available from DuPont under the trade name "Vamac" and analogous polymers described in UK Patent No. 1,548,232 the disclosure of which is incorporated herein by reference. Other copolymers suitable for use in the present invention include those derived from any of the above mentioned monomers and a cure site monomer such as 2-chloroethyl vinyl ether or 2-chloroethyl acrylate.

As thermoplastic elastomers that may be present in the polymeric composition, there may be mentioned styrene/isoprene/styrene or styrene/butadiene/styrene linear or radial block copolymers. However, as mentioned above, it may be desirable to employ polymers that are not based solely on hydrocarbon monomers, in which case the preferred thermoplastic elastomers include the segmented copolyester polymers consisting essentially of recurring intralinear long chain ester units and short chain ester units randomly joined head-to-tail through ester linkages, said long chain ester units being represented by the by the formula:

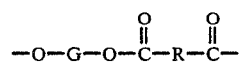

and said short chain ester units being represented by the formula:

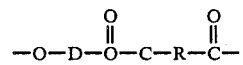

where G is a divalent radical remaining after the removal of terminal hydroxyl groups from at least one long chain glycol having a molecular weight of about 600–6000; R is a divalent radical remaining after removal of carboxyl groups from at least one dicarboxylic acid having molecular weight less than 300; and D is a divalent radical remaining after removal of hydroxyl groups from at least one low molecular weight diol having a molecular weight less than 250.

Other preferred thermoplastic elastomers include polyester amide elastomers e.g. the isocyanate based polyester amide elastomers sold by Upjohn under the trademark "Estamid". An especially preferred range of thermoplastic elastomers includes those comprising polyether and polyamide blocks, especially the so called a "polyether-ester amide block copolymers" of repeating unit:

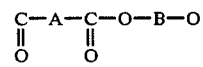

wherein A represents a polyamide sequence of average molecular weight in the range of from 300 to 15,000, preferably from 800 to 5000; and B represents a linear or branched polyoxyalkylene sequence of average molecular weight in the range of from 200 to 6000, preferably from 400 to 3000.

Preferably the polyamide sequence is formed from alpha, omega-aminocarboxylic acids, lactams or diamine/dicarboxylic acid combinations having $C_4$ to $C_{14}$ carbon chains, and the polyoxyalkylene sequence is based on ethylene glycol, propylene glycol and/or tetramethylene glycol, and the polyoxyalkylene sequence constitutes from 5 to 85%, especially from 10 to 50% of the total block copolymer by weight. These block copolymers are commercially available from ATO CHIMIE of Courbevoie, France under the trademark "PEBAX". These polymers and their preparation are described in UK Patent Specification Nos. 1,473,972, 1,532,930, 1,555,644, 2,005,283A and 2,011,450A, the disclosures of which are incorporated herein by reference.

Apart from the flame retardant, the polymeric composition may include additional additives, for example fillers, stabilisers such as ultra-violet stabilisers, antioxidants, acid acceptors and anti-hydrolysis stabilisers, foaming agents and colourants, processing aids such as plasticizers, or additional polymers, provided that these do not adversely affect the hot elongation of the composition. If additional additives are employed, then it is preferred that the compositions contain less than 5 weight percent halogen in the composition as a whole and more preferably less than 2 percent most preferably less than 0.5 percent halogen and particularly contain no halogen.

The polymeric composition may be cross-linked, for example, by the incorporation of a cross-linking agent or by exposure to high energy radiation according to the needs of the specific polymer composition. Suitable cross-linking agents are free radical initiators such as peroxides for example, dicumyl peroxide, 2,5-bis(t-butyl-peroxy)-di-isopropylbenzene. In a typical chemically cross-linkable composition there will be about 0.5 to 5 weight percent of peroxide based on the weight of the polymeric blend. The cross-linking agent may be employed alone or in association with a co-curing agent such as a poly-functional vinyl or allyl compound, e,g, triallyl cyanurate, isocyanurate or pentaerythritol tetramethacrylate.

Radiation cross-linking may be effected by exposure to high energy irradiation such as an electron beam or gamma-rays. Radiation dosages in the range 2 to 80 Mrads, preferably 2 to 50 Mrads, e.g. 2 to 20 Mrads and particularly 4 to 12 Mrads are in general appropriate, depending on the characteristics of the polymer in question. For the purposes of promoting cross-linking during irradiation, preferably from 0.2 to 5 weight percent of a prorad such as a polyfunctional vinyl or allyl compound, for example, triallyl cyanurate, triallyl isocyanurate or pentaerythritol tetramethacrylate are incorporated into the composition prior to irradiation.

The degree of cross-linking of the compositions may be expressed in terms of the gel content (ANSI/ASTM D2765-68) of the cross-linked polymeric composition, i.e. excluding non-polymeric additives that may be present. Preferably the gel content of the cross-linked composition is at least 10%, more preferably at least 40%.

The polymeric material for the inner layer is chosen to exhibit the appropriate physical properties for the intended use of the substrate. For example, where the cladded substrate is an electrical wire, the inner layer should be electrically insulating and preferably has a volume resistivty of at least $10^{10}$ to $10^{12}$ ohm cm, preferably at least $10^{14}$ e.g. from $10^{15}$ to $10^{17}$, and optionally also high voltage breakdown strength e.g. at least 2.5, especially at least 5 and most especially at least 10 kV for a layer of typical thickness from 0.1 to 0.2 mm. The preferred polymers forming the inner layer include hydrocarbon polymers e.g. alkene homo- and copolymers, preferably $C_2$-$C_6$ alkene/$C_2$-$C_{12}$ alkene copolymers, particularly ethylene copolymers with $C_3$-$C_{12}$ alkenes, especially alpha-unsaturated $C_3$-$C_{12}$ alkenes such as n-propyl-1-ene, n-but-1-ene, n-pent-1-ene and n-hex-1 ene for example ethylene/propylene elastomers. Particularly preferred ethylene copolymers contain greater than 50 weight percent, for example greater than 60 weight percent, more preferably greater than 70 percent, for example greater than 85 weight percent, ethylene e.g. low or high density polyethylene. Of particular interest are the so-called linear low density ethylene copolymers having a density in the range 0.910 to 0.940 gm/cm$^3$ at 25° C. described in UK Patent application No. 7,911,916 and Canadian Patent No. 873,828, the disclosures of which are incorporated herein by reference.

The polymeric material forming the inner layer may consist solely of the polymer or it may include inorganic filler. The quantity of filler that may be used will depend to some extent on the type of filler used and on the polymeric material and any filler loading may be used provided it does not reduce the electrical performance below the minimum values mentioned above. Thus, for example if the inner layer is formed from silica filled ethylene/propylene copolymer, filler loadings up to 60% by weight or even higher may be used whereas if the filler is a hydrated metal oxide, e.g. alumina trihydrate, then the inner layer, whatever polymeric material used, preferably contains not more than 30% and especially not more than 25% by weight of filler based on the total weight of the polymeric composition forming the inner layer.

The cladding polymer composition may be produced in a conventional manner, for example by blending the components thereof in a mixer, e.g. a Banbury mixer after preliminary surface treatment of the inorganic flame retardant it is preferred to include also one or more of the antimony (V) compounds in order to maintain the wet electrical properties of the inner layer, especially if the outer layer contains no antimony (V) compound. If the polymeric material contains a flame retardant, the amount of flame retardant used is preferably not more than 40%, especially not more than 30% e.g. up to 20% by weight based on the total weight of the polymeric material (i.e. polymer and additives).

Preferably the polymeric material forming the inner layer is also crosslinked, either by high energy irradiation or by chemical crosslinking agents as described above.

As stated above the composite cladding is tubular. It may have a cross-section that varies along its length but preferably has a uniform cross-section and is preferably formed by extrusion.

The cladding according to the invention is preferably formed in situ on the substrate. Thus the cladded substrate may be an electrical wire comprising an elongate electrical conductor formed from e.g. copper, nickel, tinned copper, silvered copper, and the like, a primary insulation provided by the inner layer of the cladding and a primary jacket provided by the outer layer of the cladding.

The cladding polymer compositions may be produced in a conventional manner, for example by blending the components thereof in a mixer, e.g. a Banbury mixer after preliminary surface treatment of the inorganic flame retardant. The composition forming the inner layer may then be extruded onto the substrate and the outer layer may then be coated on the inner layer also by extrusion. The layers may be crosslinked either simultaneously or sequentially.

The thickness of the inner and outer layers will depend on the size and intended use of the substrate. In the case of an insulated wire, the inner layer will usually have a mean thickness of at least 0.05 mm although the exact thickness may vary at different parts of the layer if for example the conductor is a stranded conductor.

Where the wire is equipment wire, otherwise known as "hook-up" wire, or other wire of this size the inner layer preferably has a thickness of from 0.05 to 3 mm especially from 0.1 to 1 mm depending on the size of the wire. Thus a 24 AWG conductor would typically have a 0.15 mm thick inner layer while a 0 AWG conductor would typically be provided with a 0.5 mm thick inner layer. The outer layer preferably has a thickness of at least 0.05, more preferably at least 0.08 and most especially at least 0.1 mm but preferably not more than 1 mm.

Alternatively, the cladding may be produced separately from the substrate, for example as a dimensionally recoverable cladding, especially a heat-recoverable cladding.

Dimensionally recoverable articles are articles having a dimensional configuration that may be made substantially to change when subjected to the appropriate treatment such as the application of an appropriate solvent as described in U.S. Pat. No. 4,070,746 and U.K. Patent Specification No. 2,018,527A, the disclosures of which are incorporated herein by reference. Of particular note are dimensionally heat-recoverable articles, that is, articles having a dimensional configuration that may be made substantially to change by heat treatment.

Usually these articles recover, on heating, towards an original shape from which they have previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,207,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat stable form in a separate stage.

In the production of heat recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Patent No. 1,440,524, an elastomeric member such as an outer tubular member is held in a stretched state by a second member, such as an inner tubular member, which, upon heating weakens and thus allows the elastomeric member to recover.

Another aspect of the invention concerns multi-conductor electrical cables.

In certain fields where cables are used, for example in military or mass transit applications, it is desired to use cables which not only do not burn but also are capable of functioning for a period of time during a fire without shorting or otherwise failing. These cables have been called circuit integrity cables or signal integrity cables depending on their use. The previously proposed cables have generally used the principle that the individual conductors should be separated from one another by mica tapes or by large volumes of packing materials or silicones or by combinations thereof in order to prevent the formation of short circuits during a fire, with the result that the previously proposed cables are relatively heavy or large or both. There is therefore a need for a cable that will retain its integrity for a period of time during a fire but which is smaller or lighter than the previously proposed cables.

According to a further aspect, the invention provides a multiconductor electric cable which comprises a bundle of electrical conductors each of which is electrically insulated from the or each other conductor by means only of an extruded insulating coating of an organic polymeric material that leaves an electrically insulating residue on combustion, the bundle being enclosed by a wrapped mineral tape and the bundle and tape being enclosed in a cable jacket.

The term "organic polymeric material" as used herein is defined as meaning a material based on one or more polymers having a solely organic backbone, for example alkene homo- or copolymers (the term "copolymer" used herein including terpolymers and polymers with four or more comonomers) or organic condensation polymers e.g. polyamides or polyesters, as distinct from polymers having inorganic backbones such as organopolysiloxanes. Preferred polymeric materials are described below.

Preferably the electrically insulating residue formed on combustion is caused by the presence of an inorganic filler, especially a flame retardant filler in the polymeric material. The preferred inorganic flame retardant fillers are those that release water on heating, that are mentioned above.

Alternatively or in addition the filler may comprise materials such as silica, preferably in finely divided form e.g. fume silica. The preferred particle size is the same as that mentioned above in respect of hydrated oxide fillers.

In view of the fact that very high loadings of inorganic flame retardent fillers may reduce the electrical performance of the conductor insulation, especially if the insulation is formed from a polymer which has a high electrical resistance e.g. polyethylene, it is preferred to adopt a dual wall construction for the conductor insulation in which the insulating coating comprises an inner layer, sometimes referred to as the primary insulator, and an outer layer, sometimes referred to as the primary jacket. Preferred materials for forming the inner layer are described above for the inner layer of the cladding.

The outer layer is preferably based on the same polymer or polymers as those described above with respect to the outer layer of the cladding. The outer layer or primary jacket preferably includes an inorganic flame retardant filler and may include a relatively high loading of the filler since the electrical properties of the cable will be governed by the inner layer. The preferred fillers are those mentioned above and are preferably, although not necessarily, treated with the treatment material for increasing the elongation of the composition. The insulation of the conductors is preferably cross-linked as described above, and preferably the cladding as described above is used to insulate the conductors.

Thus, in one type of cable construction the inner layer of the conductor insulation provides the required electrical properties of the cable insulation during service whilst the layer or layers containing high filler loadings, e.g. the outer layer, provides electrical insulation during a fire to maintain circuit or signal integrity. This construction enables a particularly small cable diameter to be obtained with good electrical properties and fire resistance. A further advantage of the general cable construction according to the invention is that, because of the absence of mica wraps around the individual wires, not only is the cable diameter significantly reduced (especially where it contains a large number of conductors) but also handling and installation of the individual conductors is made easier. Preferably the insulating coating of the or each conductor has a thickness of not more than 1 mm, more preferably not more than 0.6 mm and especially not more than 0.4 mm e.g. from 0.1 to 0.4 mm.

The bundle of conductors may, if desired, be enclosed in a single mineral tape wrap only, it is preferred for a plurality, e.g. 2 or 3 mineral tape wraps to be employed. Preferably the mineral tape contains mica and especially it comprises a mica/silicone resin composite. Alternatively, a magnesium silicate impregnated tape may be used.

The cable may be unscreened, in which case the cable jacket may be located directly on the mineral tape clad bundle, but in many instances it may be desired to provide the cable with a screen to protect the conductors from electric, magnetic or electromagnetic interference in which case the screen is preferably applied onto the mineral tape wrap or wraps and the cable jacket may be applied either onto the screen or onto a further mineral tape wrap located on the screen. Conventional braided or tape wrapped screens may be used employing either a single metal or a number if different metal layers for example as described in U.K. Patent Specifications Nos. 1,448,819 and 1,448,820, the disclosures of which are incorporated herein by reference.

Preferably the insulating coating of each conductor and/or the cable jacket are substantially halogen free, that is to say, they contain not more than 5% by weight, preferably not more than 1% by weight, more preferably not more than 0.2% by weight of halogen-containing materials and most preferably are entirely free of halogen-containing materials.

Any of the organic polymer compositions described herein may be used to form the cable jacket but preferably the jacket is based on an ethylene copolymer elastomer with a flame retardant filler and optionally also a thermoplastic polymer e.g. an alkene homo or copolymer. The preferred cable jacket materials are those described in U.S. Pat. No. 4,322,575 and U.K. Patent Specifications Nos. 1,603,205 and 2,068,347A mentioned above.

One form of cable according to the invention will now be described by way of example with reference to the accompanying drawing which is a slide elevation of part of the cable with the various layers bared.

Referring to the accompanying drawing, a number of electrical wires each comprises a central metallic conductor formed for example from tinned or nickel plated copper strands, the conductors having a nominal diameter of from 0.6 to 2.8 mm (24 AWG to 10 AWG). The conductors are insulated from one another by means of an extruded dual wall insulation for example as described in U.K. Patent Specification No. 2,128,394. The insulation comprises a 0.125 mm thick inner layer 1 formed from a highly insulating polymeric material and an outer layer 2 of thickness from 0.125 to 0.25 mm formed from a relatively highly filled polymer composition.

The following Examples illustrate the invention:

EXAMPLES 1 TO 4

78 Parts by weight of a commercially available high density polyethylene (specific gravity 0.95, M.F.I.=0.15, 3 branches per 1000 carbon atoms) were blended with 2 parts by weight of triallyl cyanurate and 20 parts by weight of a flame retardant comprising 90% by weight particulate alumina trihydrate and 10% by weight antimony pentoxide, until a uniform blend was produced This blend was then extruded onto an 18 AWG (1.22 mm diameter) tinned copper conductor as a primary insulation to give an insulated wire of diameter 1.47 mm (corresponding to a wall thickness of 0.127 mm).

90 Parts of particulate alumina trihydrate (12 m$^2$/g) which had previously been spray coated with 3% by weight of a surface treatment agent (see Table 1) were mixed with 10 parts by weight of particulate antimony pentoxide to form a flame retardant composition for Examples 1 to 2 and the comparison examples. The antimony pentoxide was omitted for Example 3. These compositions were then blended into a polymer blend comprising 50% by weight of a polyether-ester amide block coplymer sold by ATO CHIMIE under the trademark "PEBAX 40 33" (examples 1, 3 and the comparative examples) or 50% by weight of a segmented block coplyester sold under the tradename HYTREL for example 2, and 50% by weight of a vinyl acetate/ethylene copolymer (60% by weight vinyl acetate) sold by USI under the tradename EY 907, to together with various additional components to form a blend of the following composition:

| Component | Percent by weight |
| --- | --- |
| Polymer blend | 23 |
| Flame retardant composition | 73 |
| Antioxidant | 1 |
| Methylene bis acrylamide | 0.5 |
| Colourant | 0.5 |
| Wax process aid | 2 |

This composition was extruded onto the the insulated wire to form a dual wall wire of diameter 2.0 mm and the wire was then irradiated with a 0.5 MeV electron beam to an estimated dose of 10 to 12 Mrads to crosslink both layers of the cladding.

The elongation to break of the polymer composition forming the outer layer of the cladding was determined at 200° C. at a strain rate of 5 mm minute$^{-1}$ and the LOI was determined according to ASTM-D-2863. The flammability of the dual wall wire was measured in accordance with UL 758 VW-1. The surface treatment materials are shown in table I and the results are shown in table II.

Example 1 was repeated with the exception that the high density polyethylene was replaced with a low density polyethylene of specific gravity 0.918, M.F.I.=0.1 and 26 branches per 1000 carbon atoms. The results are shown in Table II under Example 4.

TABLE I

| Example No. | Surface treatment agent |
| --- | --- |
| 1,2,3 & 4 | lactic acid |
| comparison 1 | vinyl tris (methoxyethoxy) silane |
| comparison 2 | acrylic acid |

TABLE II

| TEST | EXAMPLE | | | | | |
| --- | --- | --- | --- | --- | --- | --- |
| | 1 | 2 | 3 | 4 | Comparison 1 | Comparison 2 |
| Elongation at 200° C. | 95% | 70% | 70% | 60% | 35% | 25% |
| LOI at 23° C. (% O$_2$) | 48 | * | 50.7 | * | 51 | 50.7 |
| UL 758 VW-1 | | | | | | |
| PASS FAIL | PASS | PASS | PASS | PASS | FAIL | FAIL |
| burn length (mm) | 150 | 125 | 150 | 140 | >254 | >254 |
| burn time (s) | 16 | 22 | 30 | 30 | 90 | no extinction |
| outer layer splitting | None | None | None | None | splitting observed | splitting observed |

*not measured

EXAMPLE 5

Example 1 was repeated with the exception that the polyethylene based inner layer was replaced with a 0.125 mm thick layer comprising 57.5% by weight ethylene/propylene copolymer grafted with propylene, 37.5% by weight silica and 5% by weight triallyl isocyanurate. The wire passed the UL578 VW-1 flame test with a burn length of 155 mm and a burn time of 14 seconds. No splitting of the outer layer was observed.

EXAMPLE 6

A cable construction as shown in the drawing employing seven insulated wires was formed using a dual wall conductor insulation comprising a 0.125 mm thick inner layer 1 comprising 80% by weight of cross-linked polyethylene and 20% by weight of a flame-retardant composition, comprising 91% by weight of a silane/acrylic spray coated alumina trihydrate and 9% by weight antimony pentoxide $Sb_2O_5$. The outer layer 2 of 0.25 mm thickness comprised 73% by weight of the same flame retardant as used for the inner layer, 23% by weight of a polymer composition comprising 50% of a polyether-ester amide block copolymer and 50% of a vinyl acetate/ethylene copolymer (60% by weight vinyl acetate), and 4% by weight made up from an antioxidant, colourant, cross-linking promoter and process aid. The cable was wrapped with 1 wrap 3 and 1 wrap 5 of a mica tape. The cable had a jacket 6 based on a conventional polyester/vinyl acetate ethylene copolymer blend containing 60 parts by weight of an alumina trihydrate based filler. The cable was placed in a furnace at 800° C. and in accordance with the I.E.E.331 test procedure and the conductors and shield 4 were connected to a 240 V single phase supply. The time before any two conductors shorted was recorded. The results are shown in the table.

EXAMPLE 7

A cable construction as shown in the drawing employing seven insulated wires was formed using the dual wall conductor insulation descrbied in Example 5.

The jacket had the same composition as in Example 6. The cable was placed in a furnace at 850° C. and the time before any two conductors or a conductor and the sheath 4 shorted was recorded. The Example was repeated using a furnace at 950° C. The results are shown in the table.

EXAMPLE 8

Example 7 was repeated with the exception that the outer layer 2 had a wall thickness of 0.25 mm. The results are shown in the table.

EXAMPLES 9 to 11 (COMPARISON)

Example 6 was repeated with the exception that the insulated wires were replaced with seven silicone insulated wires of insulation thickness 0.75 mm (Example 9), seven wires having a cross-linked dual wall insulation formed from a 0.175 mm polyethylene inner layer and a 0.100 mm polyvinylidine fluoride outer layer (Example 10) and seven Kapton insulated wires (Example 11). The results are shown in the table from which it can be seen that only in the case of the silicone insulated wire cable, which was considerably bulkier than the cable according to the invention, was the cable integrity comparable with that of the cable according to the invention.

TABLE

| Example | Furnace temperature/°C. | Time to failure (minutes) |
| --- | --- | --- |
| 6 | 800 | no failure after 90 minutes |
| 7 | 850 | no failure after 90 minutes |
| | 950 | no failure after 90 minutes |
| 8 | 850 | no failure after 90 minutes |
| | 950 | no failure after 90 minutes |
| 9 | 800 | no failure after 90 minutes |
| 10 | 800 | 1.5 |
| 11 | 800 | 1.6 |

EXAMPLE 12

Example 6 was repeated with the exception that the cable contained twelve wires and oven temperature was 750° C. No failure was recorded after three hours.

EXAMPLE 13

Example 7 was repeated with the exception that the tape wraps 3 and 5 were each formed from a glass fibre tape impregnated with talc and a phosphorous containing fire retardant (Lamiglas 515-ex Bayer AG). The cable was subjected to the I.E.E.331 test at 850° C. and at 950° C. using a 240 V three phase supply. No failure was recorded after three hours at either temperature.

We claim:
1. A multiconductor electric cable which comprises:

(a) a bundle of electrical conductors each of which is electrically insulated from each other conductor by means only of an insulating coating of an organic polymeric material that is extruded onto the individual conductors;

(b) a mineral tape wrapped around the bundle of electrical conductors; and (c) an outer cable jacket; wherein each insulating coating has a thickness in the range of from 0.1 to 0.4 mm and comprises an inner layer and an outer layer, the inner layer having a volume resistivity of at least $10^{10}$ ohm cm and the outer layer including an inorganic flame retardant filler that causes the insulating coating to leave an electrically insulating residue on combustion and will prevent shorting of the conductors when maintained at 800° C. for 90 minutes.

2. A cable as claimed in claim 1, wherein the filler is selected from the group consisting of hydrated metal oxides and silica.

3. A cable as claimed in claim 1, wherein the filler comprises hydrated alumina.

4. A cable as claimed in claim 1, wherein the organic polymeric material comprises an alkene homo- or copolymer.

5. A cable as claimed in claim 4, wherein the organic polymeric material comprises polyethylene or an ethylene/propylene copolymer.

6. A cable as claimed in claim 1, wherein the quantity of filler in the outer layer is at least 60% by weight based on the total weight of the outer layer.

7. A cable as claimed in claim 1, wherein the material forming the outer layer is cross-linked and the filler of the outer layer has been treated with a treatment material that will increase the elongation to break of the material forming the outer layer at 200° C. to a value of at least 50%.

8. A cable as claimed in claim 1, wherein the insulating coating of each conductor is substantially halogen free.

9. A cable as claimed in claim 1, wherein each mineral tape contains mica.

10. A cable as claimed in claim 1, wherein the cable jacket is substantially halogen free.

* * * * *

UNITED STATES PATENT AND TRADEMARK OFFICE
CERTIFICATE OF CORRECTION

PATENT NO. : 4,659,871

DATED : April 21, 1987

INVENTOR(S) : TIMOTHY S. SMITH, RICHARD J. MURPHY

It is certified that error appears in the above-identified patent and that said Letters Patent is hereby corrected as shown below:

Col. 3, line 51, after esters, delete "or" and insert in lieu thereof -- of --.

Signed and Sealed this

Eleventh Day of August, 1987

Attest:

DONALD J. QUIGG

Attesting Officer

Commissioner of Patents and Trademarks